(12) United States Patent
Olsson et al.

(10) Patent No.: US 9,537,579 B2
(45) Date of Patent: Jan. 3, 2017

(54) ANALOG PHASE NOISE COMPENSATION FOR COHERENT OPTICAL COMMUNICATION

(75) Inventors: Bengt-Erik Olsson, Hovås (SE); Christina Larsson, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 60 days.

(21) Appl. No.: 14/417,594

(22) PCT Filed: Aug. 28, 2012

(86) PCT No.: PCT/EP2012/066711
§ 371 (c)(1),
(2), (4) Date: Jan. 27, 2015

(87) PCT Pub. No.: WO2014/032705
PCT Pub. Date: Mar. 6, 2014

(65) Prior Publication Data
US 2015/0222367 A1 Aug. 6, 2015

(51) Int. Cl.
*H04B 10/61* (2013.01)
*H04B 10/64* (2013.01)

(52) U.S. Cl.
CPC .......... *H04B 10/6165* (2013.01); *H04B 10/64* (2013.01)

(58) Field of Classification Search
CPC ................................................ H04B 10/6165
See application file for complete search history.

(56) References Cited

U.S. PATENT DOCUMENTS

| 5,003,626 | A * | 3/1991 | Kuwahara | ............... | H04B 10/61 |
| | | | | | 398/204 |
| 7,085,501 | B1 * | 8/2006 | Rickard | ............... | H04B 10/611 |
| | | | | | 398/202 |

OTHER PUBLICATIONS

X. Zhang et al., "High phase noise tolerant pilot-tone-aided DP-OPSK optical communication system", Optics Express vol. 20, No. 18, Aug. 27, 2012.*

(Continued)

*Primary Examiner* — Shi K Li
(74) *Attorney, Agent, or Firm* — Patent Portfolio Builders, PLLC (57) ABSTRACT

The invention relates to a noise compensation system, configured for compensating phase noise in coherent optical communications, and to a method for compensating phase noise. The noise compensation system comprises a transmitter (1) comprising a pilot unit (5) configured for providing a pilot tone comprising a pilot spectrum, wherein the transmitter (1) is configured for transmitting an information signal comprising an information spectrum, a detecting unit (2) comprising a local oscillator lasing unit (7) configured for transmitting a local oscillator signal, wherein the detecting unit (2) is configured for combining the information signal with the local oscillator signal such that an input signal spectrum generated at an output of the detecting unit comprises an information about phase noise in the information spectrum, and a phase noise compensator (3) comprising a first branch, configured for filtering the pilot tone, and a second branch, configured for mixing the information signal with the filtered pilot tone, wherein after mixing an output signal spectrum is obtained at an output of the phase noise compensator (3) on the basis of the information about phase noise in the information spectrum such that the output signal spectrum corresponds to a phase noise compensated copy of the pilot spectrum. In this way, a noise compensation system is provided which is simple and cost-effective to realize and allows compensating phase noise in the analog domain without the need of knowledge about transmission parameters.

13 Claims, 4 Drawing Sheets

(56) References Cited

OTHER PUBLICATIONS

Qian, D., et al., "High Capacity/Spectral Efficiency 101.7-Tb/s WDM Transmission Using PDM-128QAM-OFDM Over 165-km SSMF Within C- and L-Bands", Journal of Lightwave Technology, May 15, 2012, pp. 1540-1548, vol. 30, No. 10.
Jansen, S., et al., "10-Gb/s OFDM with conventional DFB lasers", 33rd European Conference and Exhibition on Optical Communication—ECOC 2007, Sep. 16, 2007, pp. 1-2, Berlin, DE.
Lowery, J., et al., "Optical orthogonal division multiplexing for long haul optical communications: A review fo the first five years", Invited Papers, Optical Fiber Technology, Aug. 19, 2011, pp. 421-438, vol. 17, No. 5.

\* cited by examiner

ANALOG PHASE NOISE COMPENSATION FOR COHERENT OPTICAL COMMUNICATION

TECHNICAL FIELD

The invention relates to a noise compensation system, configured for compensating phase noise in coherent optical communications.

BACKGROUND

Phase noise results upon mixing two free running lasers in a coherent receiver. There is a need for compensating phase noise which is usually done in a digital signal processor, DSP for short. In certain applications is not desirable to have a DSP or it might even be impossible if, for instance, an unknown analog signal is to be transmitted. Such systems are for instance antenna distribution systems or remote antenna connections to a mobile base station where digitizing the complete signal requires unreasonable data rate in the transmission link. However, transmission of an analog signal over an optical link requires a high signal-to-noise-ratio, SNR for short, a high dynamic range and a good linearity. An optical communication link which is based on quadrature modulation and coherent detection provides a superior performance in these aspects but requires compensation of the laser phase noise in order to operate properly.

Coherent detection including balanced photo detection offers superior performance in terms of receiver sensitivity, linearity and dynamic range compared to conventional intensity detection. A main problem with coherent detection is that additional laser light is required in the receiver that is mixed, i.e. multiplied, with the incoming signal to be detected. In principle the linear detection process requires the transmitter and receiver lasers to be phase locked in order to allow full recovery of amplitude and phase. Since such a locking is not possible in practice, the detected electrical signal contains significant phase noise that must be subsequently mitigated. It is noted that phase noise estimation and compensation in principle requires prior knowledge of some properties of the data transmitted, such as modulation format and baud rate, which limit the flexibility of the transmission system.

So far it has not been reported that a coherent optical link works for arbitrary signals such as radio channels from, for instance, mobile base stations or for unknown and arbitrary waveforms from, for instance, antennas or sensors. In addition, the DSP sometimes limits the performance of a phase noise mitigation algorithm due to clock frequency limitations in the DSP application specific integrated circuit, DSP ASIC for short. There are also limitations in sampling rate of the analog-to-digital converters, ADCs for short. In practice, any signal that is supposed to be transmitted over longer distances is today electronically digitized before modulated onto an optical carrier.

Nowadays coherent optical systems implement phase noise compensation in a DSP by prior knowledge about modulation format, baud rate and signal bandwidth. Such systems cannot communicate unknown and arbitrary signals unless these are first digitized and formatted for transmission over a link. However, there exist analog optical links based on intensity modulation or detection but these suffer from poor linearity and dynamic range. Such links are not suitable for long distance communication due to deterioration from chromatic fibre dispersion, CD for short. These coherent analog links do principally not mitigate phase noise and thus usually only transmit either amplitude or phase information and thus sacrifice information capacity. Further, it is difficult to recover both amplitude and phase in the analog domain. The concept of analog carrier recovery is not the best one since it requires prior knowledge of data format used. Moreover, rather complicated recovery circuits exist for achieving a demodulation carrier as well as data recovery clock.

SUMMARY

It is the object of the invention to provide a possibility to compensate phase noise in the analog domain for arbitrary signals in conjunction with being cost-effective and simple to realize without the need of information about the transmitted data or about any transmission parameter.

This object is achieved by the subject matter of the independent claims. Preferred embodiments are defined in the sub claims.

According to a first aspect of the invention, this object is achieved by a noise compensation system, configured for compensating phase noise in coherent optical communications, comprising a transmitter comprising a pilot unit configured for providing a pilot tone comprising a pilot spectrum, wherein the transmitter is configured for transmitting an information signal comprising an information spectrum. The noise compensation system further comprises a detecting unit comprising a local oscillator lasing unit configured for transmitting a local oscillator signal, wherein the detecting unit is configured for combining the information signal with the local oscillator signal such that an input signal spectrum generated at an output of the detecting unit comprises an information about phase noise in the information spectrum, and a phase noise compensator comprising a first branch, configured for filtering the pilot tone, and a second branch, configured for mixing the information signal with the filtered pilot tone, wherein after mixing an output signal spectrum is obtained at an output of the phase noise compensator on the basis of the information about phase noise in the information spectrum such that the output signal spectrum corresponds to a phase noise compensated copy of the pilot spectrum.

Hence, a simple concept for analog noise compensation, in particular of compensating phase noise, is provided that enables coherent optical communication with no prior knowledge of the transmitted information. It is an idea of the invention to compensate phase noise by co-transmitting a pilot tone as a phase reference that is used by an analog electrical circuit to compensate amongst others phase noise introduced by the beating between transmitter and receiver lasers. It is advantageous that this simple analog system can either replace phase noise mitigation in the DSP or complement the DSP algorithm in order to increase performance or to low cost lasers with broad linewidth. The information spectrum preferably comprises a shifted copy of the pilot tone. The input signal spectrum preferably corresponds to a shifted and inverted copy of the information spectrum and also comprises the local oscillator signal.

According to a preferred embodiment of the invention, the transmitter is connectable to the detecting unit, and the transmitter further comprises a source unit and a modulator configured for modulating the emitting frequency of the source unit such that the information spectrum comprises a shifted copy of the pilot tone and the information signal is transmitted towards the detecting unit. The transmitter preferably corresponds to an optical transmitter, the pilot unit preferably corresponds to a pilot lasing unit and the modulator preferably corresponds to an optical modulator comprising a Mach-Zehnder amplitude modulator and a control unit, wherein the control unit is configured for bias control of the Mach-Zehnder amplitude modulator such that a predefined portion of light from the pilot lasing unit passes through the optical modulator. The optical modulator preferably comprises an optical filter configured for filtering at least partly the information spectrum and the information signal is preferably transmitted via an optical link towards the detecting unit. The optical transmitter preferably further comprises a first polarization maintaining splitter arranged between the pilot lasing unit and the optical modulator and a second polarization maintaining splitter arranged at an output of the optical modulator, wherein the first and the second polarization maintaining splitter are connectable to each other.

According to a preferred embodiment of the invention, the detecting unit comprises a combiner and a photo detector, more preferably a balanced photo detector pair or a single ended photo detector, wherein the combiner is connectable to the photo detector. A balanced photo detector pair is used which is preferably active, i.e. with an amplifier built in, or a single ended photo detector is used with less complexity and costs. According to other preferred embodiments, a balanced photo detector pair is used which is passive with two pin diodes connected with opposite polarities. The combiner preferably corresponds to a polarization combiner configured for splitting two orthogonal polarization states to a first polarization splitter and to a second polarization splitter and the photo detector comprises a first photo detector and a second photo detector, wherein the first polarization splitter and the first photo detector are arranged in a first branch of the detecting unit, and wherein the second polarization splitter and the second photo detector are arranged in a second branch of the detecting unit.

According to a preferred embodiment of the invention, the output signals of each of the first and the second photo detectors are directed to a summation unit configured for summing both output signals and directing the summed output signals towards the phase noise compensator.

According to another preferred embodiment of the invention, the phase noise compensator comprises a first phase noise compensation unit and a second phase noise compensation unit, wherein the first phase noise compensation unit is arranged in the first branch of the detecting unit and the second phase noise compensation unit is arranged in the second branch of the detecting unit, wherein the first polarization splitter and the first photo detector are connectable to the first phase noise compensation unit, and wherein the second polarization splitter and the second photo detector are connectable to the second phase noise compensation unit. A summation unit is preferably provided and configured for summing the corresponding output signals from each of the first and the second phase noise compensation unit such that the summed output signal spectrum corresponds to a phase noise compensated copy of the pilot spectrum.

According to a preferred embodiment of the invention, a physical length of the first branch corresponds to a physical length of the second branch such that during detection a time delay over the first branch is equal to a time delay over the second branch. The detecting unit is configured for detecting the corresponding signal.

According to a preferred embodiment of the invention, the detecting unit further comprises a first amplifier configured for amplifying an output signal of the photo detector, wherein the first amplifier is connectable to the photo detector. It is noted that the detecting unit preferably corresponds to a coherent heterodyne receiver which can be accomplished in different ways.

According to a preferred embodiment of the invention, the noise compensation system comprises a second amplifier configured for amplification of a signal at an output of the detecting unit, wherein the second amplifier is connectable to the phase noise compensator at a first end and to the detecting unit at a second end, wherein the second end is different from the first end.

According to a preferred embodiment of the invention, the first branch of the phase noise compensator comprises a filter, configured for filtering the pilot tone, and a third amplifier, configured for amplification of the filtered pilot tone. The second branch of the phase noise compensator preferably comprises a mixing unit configured for mixing the information signal with the filtered pilot tone, and the third amplifier is connectable to the mixing unit. The filter preferably comprises a bandpass filter configured for selecting a predefined frequency band around the pilot tone.

According to a preferred embodiment of the invention, a physical length of the first branch of the phase noise compensator corresponds to a physical length of the second branch of the phase noise compensator such that a time delay over the first branch is equal to a time delay over the second branch. Hence, synchronization issues do not play any role.

According to a second aspect of the invention, above mentioned object is achieved by a method for compensating phase noise in coherent optical communications, comprising the steps: a) transmitting an information signal and a local oscillator signal, wherein the information signal comprises an information spectrum which comprises a shifted copy of a pilot tone, wherein the pilot tone comprises a pilot spectrum, b) combining the information signal with the local oscillator signal such that a generated input signal spectrum comprises an information about phase noise in the information spectrum, and c) filtering the pilot tone and mixing the information signal with the filtered pilot tone, thereby obtaining an output signal spectrum on the basis of the information about phase noise in the information spectrum such that the output signal spectrum corresponds to a phase noise compensated copy of the pilot spectrum. The term "a shifted copy of a pilot tone" indicates the fact that the pilot tone is comprised by the optical spectrum transmitted over the communication fiber.

Hence, it is an idea of the invention to enable coherent optical communication without any prior knowledge of the transmitted information. It is noted that arbitrary and unknown waveforms that are transmitted over a coherent link are thus enabled and thus allow the use of modulation formats that need stable lasers or make use of low cost lasers with high linewidths. Furthermore, when the idea of the invention is used, this leads to an off-load of a receiver DSP in order to lower complexity of the DSP device and also reduces DSP power consumption.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION

Figure 1:
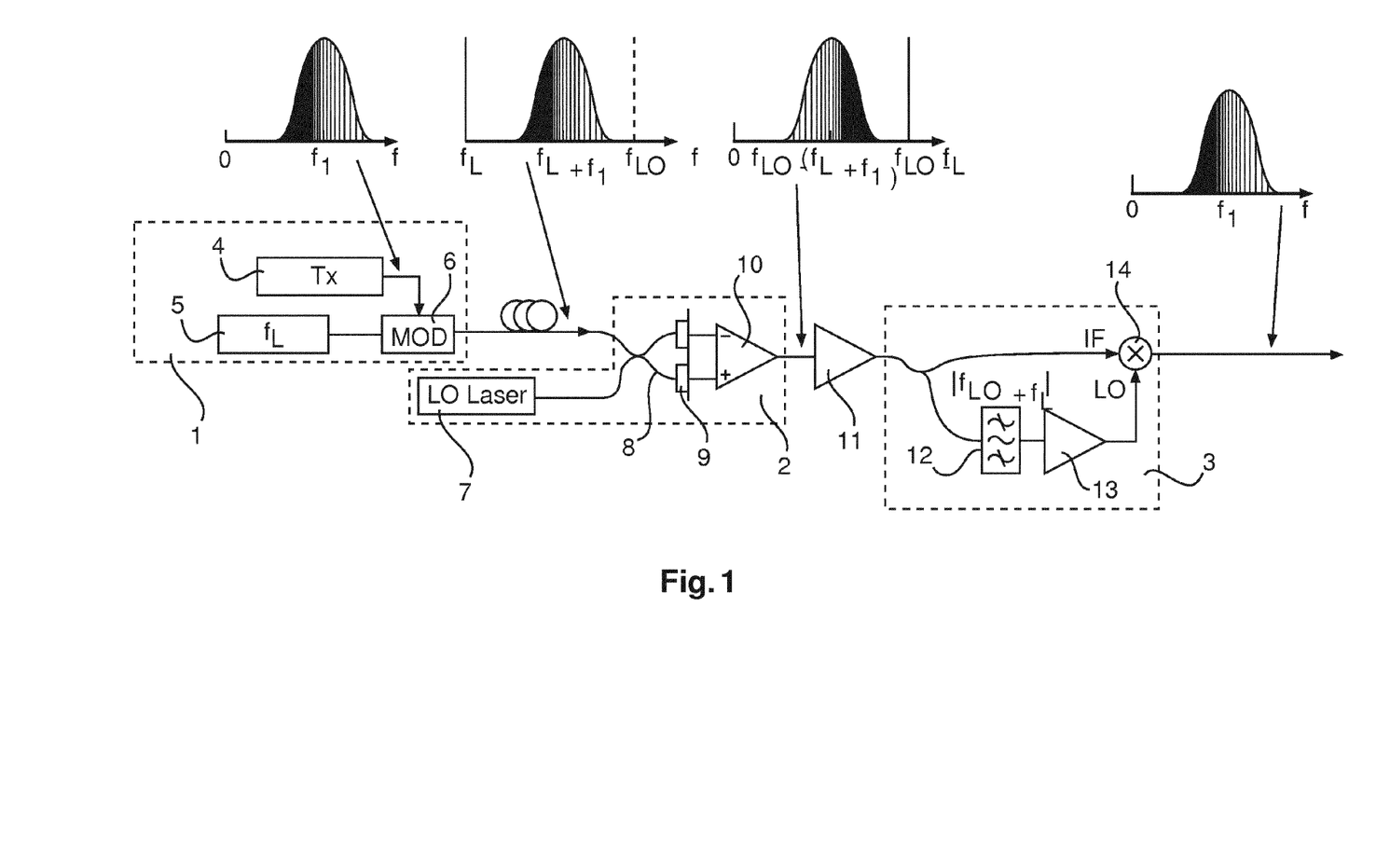
FIG. 1 illustrates a noise compensation system according to a first preferred embodiment of the invention.

FIG. 1 shows a setup for a noise compensation system according to a first preferred embodiment of the invention. Inset spectrums shown in FIG. 1 illustrate the interplay between laser frequencies, pilot and information spectrum. Heterodyne detection inverts the information spectrum and subsequent mixing with the pilot tone inverts the spectrum back to original. The noise compensation system corresponds to a transmission system with pilot tone assisted analog phase noise compensation. The analog signal to be transmitted is injected to an optical transmitter 1. The transmitter 1 is preferably accomplished by a pilot laser 5 followed by a Mach-Zehnder modulator 6, MZM for short, with bias control in order to allow a bias point that let some portion of laser light through the optical modulator 6 which is also indicated as MOD. A control unit tunes the emitting frequency of the source unit 4 which is also indicated as Tx. According to this first preferred embodiment, a baseband signal is transmitted as well as a band limited RF signal. The Tx spectrum fits within the spectrum between the Tx laser wavelength and the LO wavelength determining the frequency of the pilot tone. Regardless of its implementation, the optical transmitter 1 should output a replica of the input information in the optical domain with a single pilot tone on one side of the information spectrum. Using a single MZM provides two mirrored spectrums of the input signal around the laser frequency. The appearance of a second information spectrum does not affect the operation but, according to this first preferred embodiment, the mirrored spectrum which is not used is removed. This is done by an optical filter that is usually present in most wavelength division multiplexed transmission systems according to this first preferred embodiment of the invention. Hence, this does not add any additional complexity. According to other preferred embodiments of the invention, the mirrored spectrum is removed by the arrangement of the optical modulator.

According to this first preferred embodiment, the portion of energy in the pilot tone $f_L$ is as small as possible but performance improves with higher energy. 10% of total energy is reasonable dependent on noise conditions as well as gain in the pilot recovery circuit. After transmission the signal is combined in the combiner 8, an optical 50:50 coupler, with light from a receiver laser, also called local oscillator laser 7, LO laser for short. The detection unit 2 corresponds to a coherent heterodyne receiver and comprises a photo detector pair 9 and a first amplifier 10 amplifying the output signal of the photo detector 9. Moreover, a second amplifier 11 is provided that amplifies the output signal of the detecting unit 2 and directs it towards the phase noise compensator 3. The phase noise compensator 3 comprises two branches, wherein the first branch provides a filter 12 and a third amplifier 13. In this way the first branch is configured for providing a filtered pilot tone which is then amplified. The second branch comprises a direct path to a mixing unit 14 configured for mixing the information signal with the filtered pilot tone. At the end of the phase noise compensator 3 a phase noise compensated copy of the transmitted information spectrum is provided.

Figure 2:
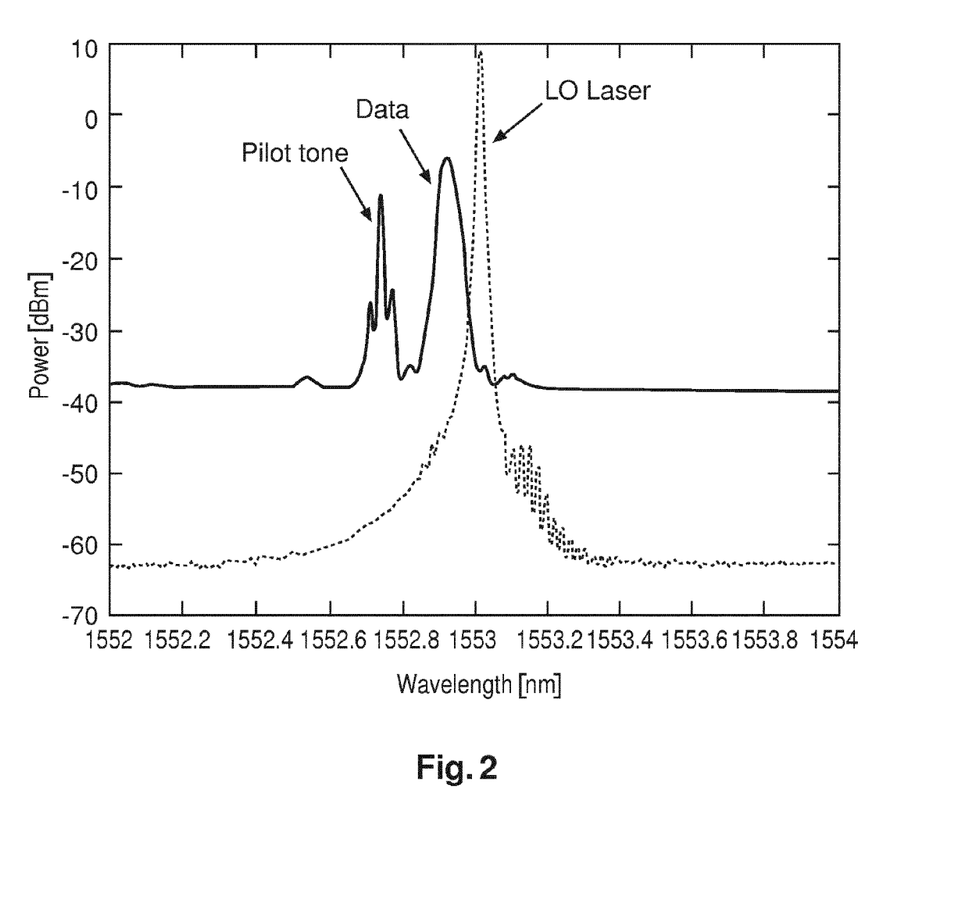
FIG. 2 shows an optical spectrum comprising pilot tone, data signal and LO laser according to the first preferred embodiment of the invention.

FIG. 2 shows the optical spectrum of the pilot tone, the data signal and the LO laser according to the first preferred embodiment of the invention. Both outputs from the coupler 8 are detected by means of a pair of photo detectors 9 with subsequent subtraction of the output currents, i.e. a so-called balanced photo detection, BPD for short, is accomplished. The output of the BPD is preferably amplified and split into two branches, where one branch carries the full information bandwidth and the other branch carries the pilot signal. A bandwidth filter selects a frequency band in the order of several MHz to GHz around the pilot frequency in order to allow simple amplification. It is noted that the bandpass filter is wide enough to include phase noise from the corresponding lasers as well as possible frequency offset due to incorrect frequency difference between the transmitter and receiver laser. The bandpass filter 12 rejects most energy from the information frequency band that otherwise may distort the output signal. Finally, the filtered pilot tone and the information signal are mixed in a mixing unit 14 after which the original signal injected to the transmitter 1 is obtained. In principle, the complete bandwidth between the transmitter laser and the LO laser 7 is recovered and since these frequencies are arbitrarily chosen, any bandwidth is achievable. The mixing unit 14 in the analog phase noise compensator 3 shows a limited bandwidth and different bandwidth for different ports which may limit the useful bandwidth of the system. According to this first preferred embodiment of the invention, the mixing unit 14 provides a bandwidth up to 40 GHz on all ports, even though not all the way down to 0 Hz. The two branches in the phase noise compensator 3 show the same time delay, i.e. the same physical length, in order not to sacrifice phase noise and frequency offset bandwidth.

Figure 3:
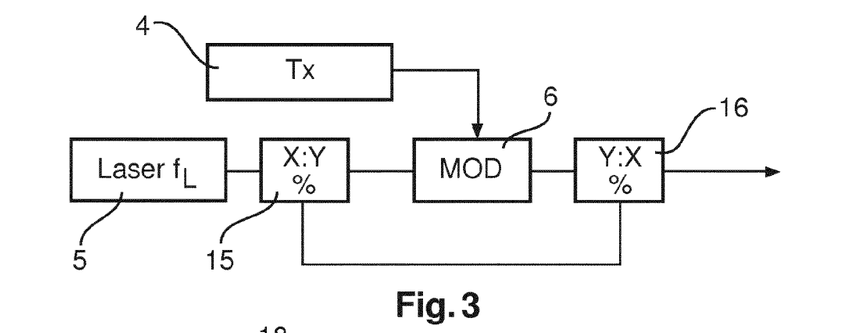
FIG. 3 shows an implementation of a transmitter providing a pilot tone according to a second preferred embodiment of the invention.

FIG. 3 shows an implementation of the transmitter providing a pilot tone according to a second preferred embodiment of the invention. Compared to the first preferred embodiment of the invention with a transmitter 1 that comprises a single MZM 6, where the original laser frequency $f_L$ was used as a pilot tone, a large fraction of power in the pilot tone sacrifices linearity and dynamic range of the modulator. According to this second preferred embodiment of the invention, an implementation of the transmitter according to FIG. 3 is more attractive. FIG. 3 shows a first polarization maintaining splitter 15 and a second polarization maintaining splitter 16, wherein light from the laser is split into two branches with a suitable power ratio 90:10 according to this second preferred embodiment of the invention. Subsequently after modulation of the input signal on the carrier in the upper branch the two branches are recombined giving a pilot tone at the original laser wavelength. The bias condition of the modulator is optimized for linear operation of the modulator and then only a small fraction of light at the original laser frequency passes the modulator. Any light at the laser frequency that may pass the modulator will interfere with the light from the bypass branch.

According to other preferred embodiments of the invention, the pilot tone is added in the electrical domain before optical modulation. Hence, the complete required spectrum is synthesized in the electrical domain comprising the pilot tone at one side of the information spectrum.

Figure 4A:
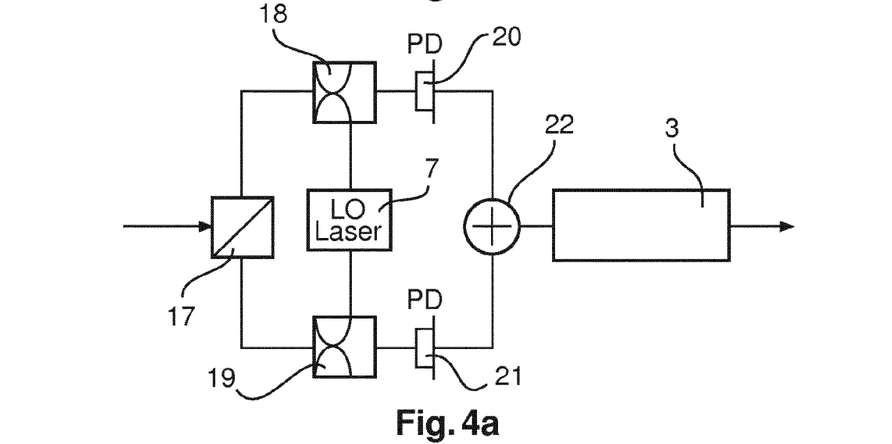
FIG. 4a illustrates an implementation for a detecting unit in a polarization diversity structure according to a third preferred embodiment of the invention.

FIG. 4a shows an implementation of the detecting unit 2 in polarization diversity structure according to a third preferred embodiment of the invention. In a realistic optical communication system, the state of polarization into the receiver is unknown and for the coherent receiver to operate the polarization state of the LO laser 7 must be the same as the incoming light. This requires the receiver to both track the input polarization state and adjust the LO polarization accordingly or the receiver may comprise two optical detection units that separately detect the two orthogonal polarization components and combine the signals in the electrical domain. Hence, the combiner corresponds to a polarization combiner 17 which splits light to a first and a second polarization splitter 18, 19. Two orthogonal polarization states are detected in photo detectors 20, 21 which will make all optical power to be converted into the electrical domain regardless of input polarization state and sum the electrical signals in a summation unit 22 before it goes to the phase noise compensator 3.

Figure 4B:
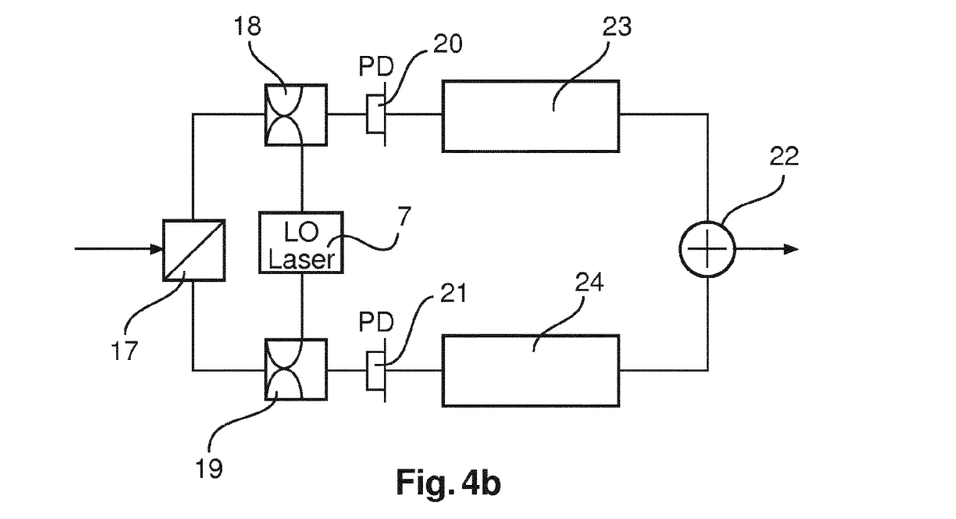
FIG. 4b illustrates an implementation of a detecting unit in a polarization diversity structure according to a fourth preferred embodiment of the invention.

FIG. 4b shows an implementation of the detecting unit 2 according to a fourth preferred embodiment of the invention. Also FIG. 4 presents the detecting unit 2 in polarization diversity structure in order to allow arbitrary input polarization states. FIG. 4b shows two independent phase noise compensation units 23, 24, wherein a summation unit 22 is provided for summing the output from these two units 23, 24. Comparing FIG. 4b to FIG. 4a shows that both implementations have pros and cons from a component perspective but work equally. The implementation of the detecting unit 2 according to FIG. 4b is safer but the implementation according to FIG. 4a is more cost-effective to realize. Note that the time delays in the two orthogonal polarization branches up to the summation unit 22 are equal in the third and fourth preferred embodiments. Hence, this does not cause any bandwidth reduction.

A significant performance improvement is possible dependent on the actual implementation. The inventive concept allows the use of low cost lasers like distributed feedback lasers, DFB lasers for short, and also the use of external cavity lasers, EC lasers for short. For a conventional low cost DFB laser, the phase noise can be reduced by two orders of magnitude and with an advanced stable EC laser the improvement lies in the order of a factor of 10 dependent on the actual implementation.

Figure 5:
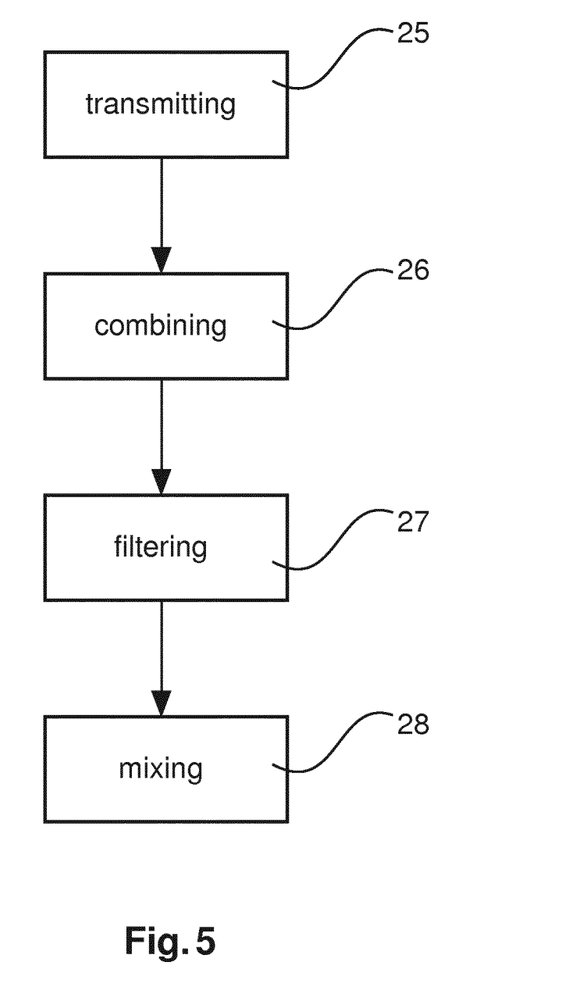
FIG. 5 illustrates the steps of a method for compensating phase noise in coherent optical communications according to a fifth preferred embodiment of the invention.

FIG. 5 illustrates the steps of a method for compensating phase noise in coherent optical communications according to a fifth preferred embodiment of the invention. The method comprises the steps of transmitting 25 an information signal and a local oscillator signal, wherein the information signal comprises an information spectrum which comprises a shifted copy of the pilot tone. The pilot tone comprises a pilot spectrum. In a second step, the information signal is combined 26 with a local oscillator signal such that a generated input signal spectrum comprises an information about phase noise in the information spectrum. In a final step, the pilot tone is filtered 27 and mixed 28 with the information signal with the filtered pilot tone, thereby an output signal spectrum on the basis of the information about phase noise in the information spectrum is obtained. In this way, the output signal spectrum corresponds to a phase noise compensated copy of the pilot spectrum. The method is simple to realize and significantly reduces the impact of phase noise which would otherwise lead to instability.

While the invention has been illustrated and described in detail in the drawings and foregoing description, such illustration and description are to be considered illustrative or exemplarily and not restrictive; the invention is not limited to the disclosed embodiments.

Other variations to the disclosed embodiments can be understood and affected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that the combination of these measures cannot be used to advantage. Any reference signs in the claims should not be construed as limiting the scope.

The invention claimed is:

1. A noise compensation system, configured for compensating phase noise in coherent optical communications, the noise compensation system comprising:
   a transmitter comprising a pilot unit configured to provide a pilot tone comprising a pilot spectrum,
      wherein the transmitter is configured to transmit an information signal comprising an information spectrum, and
      wherein the transmitter corresponds to an optical transmitter and the pilot unit corresponds to a pilot lasing unit;
   a detecting unit comprising a local oscillator lasing unit configured to transmit a local oscillator signal,
      wherein the detecting unit is configured to combine the information signal with the local oscillator signal such that an input signal spectrum generated at an output of the detecting unit comprises information about phase noise in the information spectrum,
      wherein the transmitter is connectable to the detecting unit,
      wherein the transmitter further comprises a source unit and a modulator configured to modulate an emitting frequency of the source unit such that the information spectrum comprises a shifted copy of the pilot tone and the information signal is transmitted towards the detecting unit,
      wherein the modulator corresponds to an optical modulator comprising a Mach-Zehnder amplitude modulator and a control unit, and
      wherein the control unit is configured for bias control of the Mach-Zehnder amplitude modulator such that a predefined portion of light from the pilot lasing unit passes through the optical modulator; and
   a phase noise compensator comprising:
      a first branch configured to filter the pilot tone, and
      a second branch configured to mix the information signal with the filtered pilot tone,
   wherein the phase noise compensator is configured to output, after mixing and at an output of the phase noise compensator, an output signal spectrum based on the information about phase noise in the information spectrum, such that the output signal spectrum corresponds to a phase noise compensated copy of the pilot spectrum.

2. The noise compensation system of claim 1:
   wherein the optical modulator comprises an optical filter configured to filter at least partly the information spectrum; and
   wherein the information signal is transmitted via an optical link towards the detecting unit.

3. The noise compensation system of claim 1:
   wherein the optical transmitter further comprises:
      a first polarization maintaining splitter arranged between the pilot lasing unit and the optical modulator; and a second polarization maintaining splitter arranged at an output of the optical modulator;
wherein the first and the second polarization maintaining splitters are connectable to each other.

4. A noise compensation system, configured for compensating phase noise in coherent optical communications, the noise compensation system comprising:
a transmitter comprising a pilot unit configured to provide a pilot tone comprising a pilot spectrum,
wherein the transmitter is configured to transmit an information signal comprising an information spectrum;
a detecting unit comprising a local oscillator lasing unit configured to transmit a local oscillator signal,
wherein the detecting unit is configured to combine the information signal with the local oscillator signal such that an input signal spectrum generated at an output of the detecting unit comprises information about phase noise in the information spectrum,
wherein the detecting unit comprises a combiner and a photo detector,
wherein the combiner is connectable to the photo detector,
wherein the combiner corresponds to a polarization combiner configured to split two orthogonal polarization states to a first polarization splitter and to a second polarization splitter,
wherein the photo detector comprises a first photo detector and a second photo detector,
wherein the first polarization splitter and the first photo detector are arranged in a first branch of the detecting unit, and
wherein the second polarization splitter and the second photo detector are arranged in a second branch of the detecting unit; and
a phase noise compensator comprising:
a first branch configured to filter the pilot tone, and
a second branch configured to mix the information signal with the filtered pilot tone,
wherein the phase noise compensator is configured to output, after mixing and at an output of the phase noise compensator, an output signal spectrum based on the information about phase noise in the information spectrum, such that the output signal spectrum corresponds to a phase noise compensated copy of the pilot spectrum,
wherein the phase noise compensator comprises a first phase noise compensation unit and a second phase noise compensation unit,
wherein the first phase noise compensation unit is arranged in the first branch of the detecting unit,
wherein the second phase noise compensation unit is arranged in the second branch of the detecting unit,
wherein the first polarization splitter and the first photo detector are connectable to the first phase noise compensation unit, and
wherein the second polarization splitter and the second photo detector are connectable to the second phase noise compensation unit.

5. The noise compensation system of claim 4, further comprising a summation unit configured to sum corresponding output signals from each of the first and the second phase noise compensation units such that the summed output signal spectrum corresponds to the phase noise compensated copy of the pilot spectrum.

6. The noise compensation system of claim 4, wherein a physical length of the first branch of the phase noise compensator corresponds to a physical length of the second branch of the phase noise compensator such that during detection a time delay over the first branch of the phase noise compensator is equal to a time delay over the second branch of the phase noise compensator.

7. The noise compensation system of claim 4:
wherein the detecting unit further comprises a first amplifier configured to amplify an output signal of the photo detector; and
wherein the first amplifier is connectable to the photo detector.

8. The noise compensation system of claim 7:
further comprising a second amplifier configured to amplify a signal at an output of the detecting unit;
wherein the second amplifier is connectable to the phase noise compensator at a first end and to the detecting unit at a second end; and
wherein the second end is different from the first end.

9. The noise compensation system of claim 8, wherein the first branch of the phase noise compensator comprises a filter configured to filter the pilot tone and a third amplifier configured to amplify the filtered pilot tone.

10. The noise compensation system of claim 9:
wherein the second branch of the phase noise compensator comprises a mixing unit configured to mix the information signal with the filtered pilot tone; and
wherein the third amplifier is connectable to the mixing unit.

11. The noise compensation system of claim 9, wherein the filter comprises a bandpass filter configured to select a predefined frequency band around the pilot tone.

12. The noise compensation system of claim 1, wherein a physical length of the first branch of the phase noise compensator corresponds to a physical length of the second branch of the phase noise compensator such that a time delay over the first branch of the phase noise compensator is equal to a time delay over the second branch of the phase noise compensator.

13. A method for compensating phase noise in coherent optical communications, the method comprising:
providing, by a pilot lasing unit, a pilot tone comprising a pilot spectrum;
modulating, by an optical modulator, an emitting frequency of a source unit of a transmitter such that an information spectrum, of an information signal, comprises a shifted copy of the pilot tone,
wherein bias control of the optical modulator is performed by a control unit of the optical modulator such that a predefined portion of light from the pilot lasing unit passes through the optical modulator;
transmitting, by the transmitter, the information signal and a local oscillator signal;
combining, by a detecting unit, the information signal with the local oscillator signal such that a generated input signal spectrum comprises information about phase noise in the information spectrum; and
filtering, by a phase noise compensator, the pilot tone and mixing, by the phase noise compensator, the information signal with the filtered pilot tone, thereby obtaining an output signal spectrum based on the information about phase noise in the information spectrum, such that the output signal spectrum corresponds to a phase noise compensated copy of the pilot spectrum.

* * * * *